US007061493B1

(12) United States Patent
Cook et al.

(10) Patent No.: US 7,061,493 B1
(45) Date of Patent: Jun. 13, 2006

(54) SYSTEM FOR DESIGNING AND RENDERING PERSONALITIES FOR AUTONOMOUS SYNTHETIC CHARACTERS

(75) Inventors: Linda K. Cook, Sacramento, CA (US); Timothy W. Bickmore, Somerville, MA (US); Joseph W. Sullivan, San Francisco, CA (US); Elizabeth Churchill, San Francisco, CA (US); Scott A. Prevost, San Francisco, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/287,521

(22) Filed: Apr. 7, 1999

(51) Int. Cl.
*G06T 17/00* (2006.01)

(52) U.S. Cl. ...................................... 345/473; 345/474

(58) Field of Classification Search ................. 345/473, 345/474, 475
See application file for complete search history.

(56) References Cited

U.S. PATENT DOCUMENTS 5,563,988 A   10/1996   Maes et al. ................. 395/121
6,657,628 B1 * 12/2003   Cook ......................... 345/473

OTHER PUBLICATIONS

Blumberg, B. et al. Multi–Level Direction of Autonomous Creatures for Real–Time Virtual Environments. Proc. 22nd Annual International Conference on Computer Graphics and Interactive Techniques. pp. 47–54. 1995.*

Extempo is currently developing a proprietary software product called "Imp" that provides interactive improvisational characters for applications in e–commerce, entertainment, and business. Characters can be realized in a variety of embodiments (animation, graphics, text) and can be scripted by personality, attitude and moods. Http://www.extempo.com.

D. Rousseau & B. Hays–Roth. *Improvisational Synthetic Actors with Flexible Personalities*, Knowledge Systems Laboratory Technical Report No. KSL–97–10, Dec. 1997, available at: http://ksl;–web.stanford.edu/abstracts_by_author/Hayes–Roth,B.papers.html.

C. Elliot. *The Affective Reasoner*. Institute for Learning Sciences Technical Report No. 32, 1992, available at: http:www/depaul.edu/~elliot/ar.html.

J. Bates. *The Nature of Character in Interactive Words and The Oz Project* (and other papers) available at http://www.cs.cmu.edu/afs/cs.cmu.edu/project/oz/web/papers.html.

(Continued)

*Primary Examiner*—Matthew C. Bella
*Assistant Examiner*—Cliff N. Vo
(74) *Attorney, Agent, or Firm*—Fliesler Meyer LLP

(57) ABSTRACT

Personality traits displayed on a workbench are grouped into a character profile that is utilized in determining the personality and/or specific actions of a synthetic character. The personality traits are selectable by an operator from graduated dials. The personality traits may also be displayed in the form of selectable attributes or trait indicative behaviors that, when selected, are mapped into predetermined amounts of each trait in the character profile. The character profile is utilized to compute activation levels for primary behaviors, which are selected to influence or direct behavior of the synthetic character. Secondary behaviors are also selected, but discarded if conflicting with the selected primary behaviors. When behaviors are selected, the corresponding behaviors are translated into classes of 'personality effectors' that modulate the synthetic character's behavioral expression to reflect the desired set of traits.

5 Claims, 5 Drawing Sheets

FUNCTIONAL CHARACTERS     PERSONALITY WORKBENCH     PERSONALITY EFFECTORS     APPLICATION

OTHER PUBLICATIONS

B. Blumberg. *Action–Selection in Hamsterdam: Lessons from Ethology* (and other papers) available at: http://bruce.www.media.mit.edu/people/bruce/.

C. Dryer. "Ghosts in the Machine, Personalities for Socially Adroit Software Agents"in *Proc. Socially Intelligent Agents Workshop* (part of the AAAI Fall Symposium series), Cambridge, MA, Nov. 8–10, 1997, p. 31. Http://www.ibm.com/ibm/HCI/exhibits/intelligent_iterfaces/warguide.html.

[MicrosoftOA] Lumiere Project:Bayesian Reasoning for Automated Assistance http://www.research.microsoft.com/research/dtg/horvitz/lum.htm.

[MicrosoftAgent] Microsoft Corporation. *Introduction to Microsoft Agent* (and other associated documentation), available at http://www.microsoft.com/workshop/prog/agent/.

* cited by examiner

SYSTEM FOR DESIGNING AND RENDERING PERSONALITIES FOR AUTONOMOUS SYNTHETIC CHARACTERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to human-computer interfaces (HCI). The invention is more particularly related to a tool set for modeling and creation of a personality for an animated anthropomorphic character HCI that interacts with a user. The invention is even more particularly related to a tool set that allows the inclusion of new and the modification of existing personality attributes to produce a unique and engaging anthropomorphic character personality.

2. Discussion of the Background

Autonomous synthetic computer characters have become a technological and commercial reality in the last few years, both as alternative user interface mechanisms and as entertainment devices. The Microsoft Office Assistant, Microsoft Agent, IBM's Warp Guide, and Extempo's Imp Software are all recent attempts to commercialize user interface technology developed over the last decade at academic research institutions. The explosion in computer games which utilize synthetic characters and their increased use in television and motion pictures also indicate a strong demand for advances in this technology.

One such advance is the basic action selection architecture (BASA) developed in the ALIVE project at the MIT Media Lab. The BASA is used for run-time simulation of characters in deliverable applications.

In the BASA, behaviors are arranged in a hierarchy with those at the top of the hierarchy being more abstract categories of behavior and those at the bottom being operational in that they have simulation routines associated with them which allow the character to perform them when commanded. Behaviors at each level in the hierarchy compete every time step of the simulation for control of the character. The result of this competition is one primary behavior, which is the primary action the character performs at that time step.

However, most of the research and development in this area to date has been on realistic rendering, real-time animation, and "functional" autonomous behavior, while the issue of character personality is typically left for an animator or script writer to fashion in an "artistic" (i.e., unprincipled) manner.

SUMMARY OF THE INVENTION

The present inventors have realized the need to utilize personality in efforts to develop better synthetic characters, and the need for a method to apply personality to synthetic characters. The present inventors have also realized that the application of certain personality traits to synthetic characters can make the synthetic characters more engaging, and more quickly accepted by users, easing the learning and familiarization process of an application to which the synthetic characters are applied.

Accordingly, it is an object of the present invention provide developers a workbench for developing and creating personalities for synthetic characters.

It is another object of the present invention to provide a workbench that allows personality traits to be programmed into a synthetic character developed for an application within a BASA-like architecture.

It is yet another object of the present invention to modify a behavioral hierarchy of a BASA architecture and provide for the selection of primary and non-conflicting secondary behaviors implementing personality traits of a character profile.

The present invention describes a system for designing recognizable personalities in synthetic computer characters in order to better engage users. A personality design workbench enables designers to describe personality attributes that modify a behavioral hierarchy, particularly useful for characters created in a simulation environment having a reactive action selection architecture. These systems may be utilized to build applications for conversational characters (anthropomorphic user interfaces) and for entertainment purposes.

Typically, known characters share the same behavioral sets and display only minimal, if any, inter-character individuation. To broaden personality expression in such characters (individuation), the personality design workbench outputs a set of 'personality effectors' able to modify a prescribed set of behaviors within a BASA behavioral hierarchy to clearly portray uniquely different character personalities.

These and other objects are accomplished by a system for rendering personalities for synthetic characters, including a personality trait selection device that displays at least one selectable personality trait, and a personality builder that groups the selected personality traits into a character profile.

The personality trait selection device may include trait indicators (graduated dials, for example), each trait indicator representing an amount of a corresponding one of the selectable personality traits. The personality builder weights each selected personality trait in said character profile according the amount of each selected personality trait represented in the corresponding trait indicator.

The system may also include a personality attribute selection device that displays at least one selectable personality attribute, and a mapper configured to map each selected personality attribute into amounts of the trait indicators according to an amount each selected personality attribute is represented in the selectable personality traits.

The invention includes a method of selecting behavior for a synthetic character, comprising the steps of computing a primary activation level of primary behaviors in each of plural nodes at a given level of a modified behavior hierarchy, selecting a node having a highest activation level, and executing the primary behavior in accordance with an action defined by the selected node. The method may include selecting a secondary behavior level, and discarding the secondary behavior if it conflicts with a selected primary behavior.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present inventors have realized that a consistent, readily-identifiable personality is crucially important in synthetic character applications for at least the following reasons:

Personality helps to engage the user. Both anthropomorphic interfaces and entertainment applications require that the user "suspend disbelief" while using them. A character with a well-designed personality can not only attract users into using a system but can help maintain the illusion that they are interacting with a real entity.

Personality facilitates user identification with the character in "ally" interfaces. In Conversational Character systems in which the character acts as the user's ally in using a complex system, a properly designed personality can increase the user's sense of allegiance with the character.

Personality can be used to establish the user's expectations about the system. A character with a dominant personality will be expected to lead the user in mixed-initiative interactions; a submissive character will be expected to do the opposite.

Personality can be used to control the user's style of interaction with the system. An immature or child-like character can be used to subconsciously coax the user into speaking slowly to accommodate imperfections in the speech recognition system.

Personality can be used to control the user's affective response to the system. People have affinity for others who have personalities similar to theirs and even greater affinity for those who modify their personality to be more like them. Such phenomena could be leveraged to make users like a particular product more than they would otherwise.

Personality is central for entertainment applications. Personality is central to character development which is crucial to any story upon which an entertainment system may be based.

The present inventors have realized that personality may be utilized as an additional tool to develop better synthetic conversational characters and consequently better software applications. At a minimum, conversational characters provide a more familiar mode of communication for users ☐ enabling the character to have a more congenial relationship such as a mentor or assistant to the user. The capacity to augment these characters with identifiable personalities can produce not only richer applications but also considerable design enhancements for the developer.

Users will find personable synthetic characters to be more engaging, more comfortable and ultimately easier with which to work. The benefits for fielded applications are clearly evident: ease of learning and tool familiarization, more ready acceptance by users and an application that is more highly regarded. From a design perspective, developers can more readily tailor multiple versions of an application for different classes of user and experiment with different aspects of personality to improve engagement with or enhance user acceptance of new applications.

Figure 1:
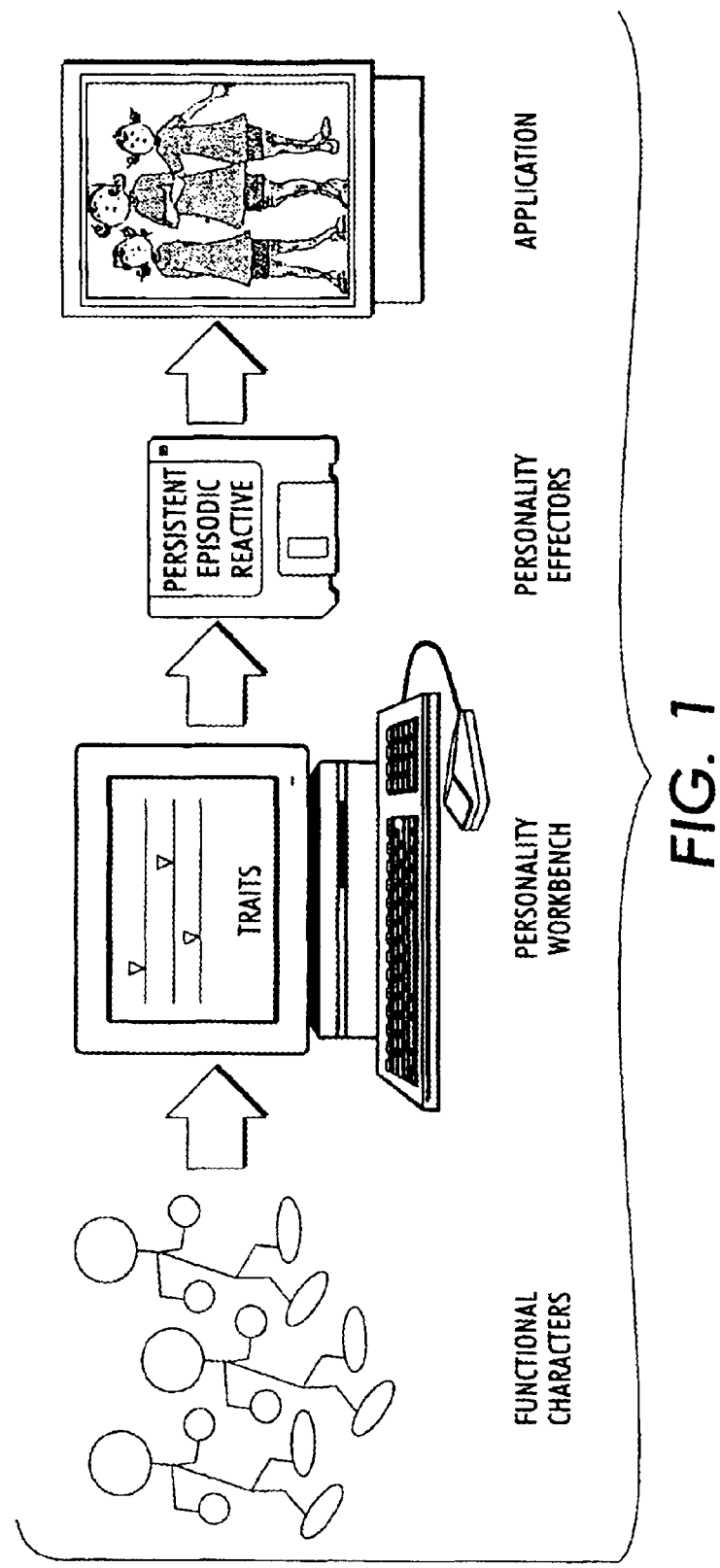
FIG. 1 is an overview of a process for utilizing a workbench for developing a personality to be applied to one or more synthetic characters.

The present inventors have developed a novel approach to modeling personality. The model is the basis for a personality design workbench that assists developers in creating personable characters and also underlies a personality engine that realizes design specifications within character behavior. The design process, workbench and character realization are schematically depicted in FIG. 1.

The personality design workbench (personality workbench, or simply workbench) outputs characters which are constructed to be used within a specific reactive action selection architecture designed for autonomous synthetic character applications (BASA architectures, for example) The personality workbench may also output characters for other (or multiple) architectures. The specific reactive action selection architecture is ethological in origin and models how characters choose their behaviors based on constructs such as internal and external states, releasing mechanisms, inhibition and fatigue. Behavior selection at each cycle in the system is determined by the outcome of a summative relationship between these factors in a 'winner take' all competition that ensures that the character maintains coherency in its behavior.

The two problems addressed by the personality design workbench are:

1) how should personality be specified by a character designer; and 2) how to map from the desired personality specifications to the selection of character behaviors such that those behaviors will clearly reflect the intended personality.

The present invention presents a method for formalizing personality expression by drawing on research from two disciplines: personality trait theory and human communication theory. Trait theory suggests that people clearly communicate notions of personality with descriptive, trait-like words found in their cultural lexicon. These personality-based linguistic constructs or 'labels' are used by people to both describe and classify people based on behavioral similarities. Research has clearly demonstrated that traits are highly stable predictors of future behavior, that people use only the features associated with a small set of traits when classifying individual personalities and there is a high degree of consensus about the typical behavioral descriptors associated with specific traits. For example, most people describe introverts as being quiet, shy and retiring. It is clear, however, that the descriptors 'quiet, shy and retiring' do not provide sufficient data upon which to create an introverted character.

In human communication theory, personality is seen as part of a dynamic, communicative process—it is both emitted (or encoded) by an individual and subsequently 'decoded' by a viewer. As encoders, humans display aspects of their personality across multiple independent channels which tend to be predominantly nonverbal in nature (e.g., posture, gross body movement, facial and eye expression, or hand gestures). Likewise, as decoders humans read from and combine information across multiple channels to form an overall impression of both the person and their message. Thus, research has shown that introverts tend to display the following kinds of behavior: they speak little and only when spoken to, they assume a closed body posture and they tend to avoid eye contact. If a person (or an embodied character) were to display these behaviors they would be labeled as introverts. Our methodological approach is thus to isolate a basic set of personality traits and trait indicative nonverbal and verbal behaviors (i.e. people believe the behavior reflects a specific trait), and, finally translate those behaviors into classes of 'personality effectors' that can modulate a character's behavioral expression within the simulation environment so as to reflect the desired set of traits.

There have been a number of research projects examining personality from two perspectives: the effects of personality on non-anthropomorphic interface design (User Interface Design) and the impact of personality on agent behavior in interactive, fictional worlds (Interactive Worlds).

User Interface Design

IBM's software agent WarpGuide is an agent-oriented task guide that assists people with system tasks. It employs a personality (intelligent, friendly and unobtrusive) that was deemed task-appropriate (i.e. a mentor), a weak physical rendering of that personality (i.e. text boxes with rounded corners, warm colors) and a message content that was biased along the same personality dimensions. Experimental studies suggested users responded positively to the characterization. However, since the actual interface was limited to text, these "agents" did not address the use of multiple simultaneous channels for conveying personality (including, in particular, human trait-indicative non-verbal behaviors).

Interactive Worlds

In The Virtual Theater project at Stanford, use a social-psychological model of personality. However, it has many deficiencies: 1) it is only able to select one behavior per time step (simultaneous use of multiple channels is not possible); 2) the basic action selection approach is severely impoverished (no perception, no coherence of action, and boredom/fatigue is modeled by randomization); 3) no provision integrating more complex, deliberative behavior (e.g., task planning, face-to-face communicative behavior); 4) use of traits and non-verbal behaviors is ad-hoc; and 5) personality models are difficult and confusing to author, and difficult to predict given that traits can change over time.

Both the OZ project at CMU and the Affective Reasoner project at DePaul use a cognitive model of emotion based on Ortony. The emotion module in OZ reasons over recent events and the agent's goals to create an emotional interpretation of the current status of the system. Emotions are generated by comparing an event outcome to an agent's current goals (e.g., goals succeed/fail which result in happy/sad emotional states). The emotional interpretation (if any) is returned to the behavior engine for use in selecting the agent's next behavior—allowing emotion to play a role in behavior selection. Elliot's Affective Reasoner uses the same emotion model as OZ but gives agents a rudimentary personality using two related constructs: disposition and temperament. Disposition is an 'interpretive' personality construct that enables agents to differentially interpret events. Temperament is the 'manifestive' component of personality that guides an agent's expression of emotional state in its behavior. Neither of these approaches utilize a trait-based specification of personality nor trait-indicative non-verbal behaviors. The Oz project utilized very primitive synthetic characters which could only exhibit one behavior at a time (multiple simultaneous channels are not available); the Affective Reasoner is a text-only system.

The present invention has the following features: 1) An approach based on extensions to an ethologically-correct action selection architecture; 2) the personality "workbench" provides multiple simple authoring mechanism; 3) all information about personality and its behavioral effects are encapsulated with a character; 4) a character can portray persistent trait-indicative non-verbal behaviors through "persistent personality effectors"; 5) a character can portray conditional and temporally-bounded trait-indicative non-verbal behaviors through "episodic personality effectors"; 6) a character can portray trait-indicative actions in response to user actions through "reactive personality effectors"; 7) a character can modulate how it performs actions via "modulating personality effectors"; 8) a character can alter its perception and assessment (construal) of situations in its environment through "construal personality effectors"; 9) the workbench will suggest non-behavioral modifications to the physical design of the character; 10) characters can use multiple simultaneous communication channels to project personality; 11) the selection of traits and non-verbal behaviors used are based on research in psychology and communications; and 12) personality is presented as indigenous to a character.

1. The Approach is Based on Extensions to an Ethologically-correct Action Selection Architecture.

The "personality workbench" produces extensions and modifications to a basic action selection architecture. This architecture ensures natural, coherent behavior while allowing for multiple, simultaneous actions, based on the character's perception of its environment, internal state and level of boredom and fatigue. This model can be readily extended to perform deliberative actions such as task planning.

2. The Personality "Workbench" Provides Multiple Simple Authoring Mechanism.

Character designers can specify personality either by direct manipulation of trait values (e.g., a value between −10 and +10 on the warm/cold dimension), through the selection of desired trait attributes (e.g., a character which is kind, sympathetic, soft-hearted and affectionate), or via selection of desired non-verbal behaviors (e.g., makes frequent and expansive gestures). Limited editions, combinations, and variations of the above mechanisms are also envisioned.

3. All Information About Personality and its Behavioral Effects is Encapsulated Within a Character.

Trait-indicative nonverbal signaling behaviors and mechanisms for personality-biased modulation of behavior are organized in a set of modular data structures. These data structures, called "personality effectors", enable multi-faceted personality expression which is enduring, consistent and predictable across time and events.

4. A Character can Portray Persistent Trait-indicative Non-verbal Behaviors Through "Persistent Personality Effectors"

Personality descriptions are used to select non-verbal behaviors that act as "default" behaviors for the character. They are subtle, have a high frequency of occurrence and will always be expressed whenever they do not conflict with the primary behavior the character is executing. Examples are body posture (e.g., slumped) and facial expression (e.g., frown).

5. A Character can Portray Conditional and Temporally-bounded Trait-indicative Non-verbal Behaviors Through "Episodic Personality Effectors"

Like persistent behaviors these are largely nonverbal in nature and unconscious. Unlike persistent behaviors they appear only periodically, under well specified time constraints and are competitive with other behaviors for activation. Examples are self-face touching as a signal of nervousness and gaze avoidance as a signal of submissiveness.

6. A Character can Portray Trait-indicative Actions in Response to User Actions Through "Reactive Personality Effectors".

For task-oriented application domains in which the character and user have goals they are trying to achieve, the workbench will produce behaviors which enable the character to respond in a trait-indicative manner to actions taken by the user. Examples are facial flush (submissive) or violence (dominant) when the user thwarts a goal of the character. 7. A Character can Modulate how it Performs Actions via "Modulating Personality Effectors".

Modulating personality effectors change how the character performs a given action. These are essentially hints to the various behavior routines which suggest, for example, that if the character needs to walk it should walk decisively (dominant) or nervously (tense). These effectors can also modify the performance of linguistic components of conversational characters by effecting word choice and sentence structure decisions (e.g., "Could you possibly spare something to drink?" vs. "Give me some water!"). Modulating effectors can also be systemic in that they effect how the action selection architecture itself functions by modifying the amount of deliberation performed by the system, the boredom and fatigue decay rates, etc.

8. A Character can Alter its Perception and Assessment (Construal) of Situations in its Environment Through "Construal Personality Effectors".

Different personality types see the world differently. For example, tense character will react more rapidly to an approaching user than a relaxed one will.

9. The Workbench Will Suggest Non-behavioral Modifications to the Physical Design of the Character.

These suggestions include both invariant physical features (body type, facial structure), variable personal artifacts, and suggestions for designing the character's setting (furniture, etc.).

10. Characters can use Multiple Simultaneous Communication Channels to Project Personality.

Nonverbal behaviors appear in multiple, readily identifiable channels (i.e. face, posture, etc.), they can be expressed in parallel (appear in two or more channels simultaneously) and often carry redundant messages. Having multiple concurrent communication channels through the use of secondary behaviors will affect character-to-human communication in several fundamental ways:

Additional information channels broaden the communication bandwidth and thus increases the amount of information being conveyed at any one point.

Cross channel message redundancy or the tendency for more than one channel to carry the same message increases the probability that a character will be compatible with a wider range of users. For example, men tend to look more closely at hand gestures while women track eye behavior and facial expression. Concurrent channels that carry the same message will reach a broader audience.

Characters who express personality using trait-indicative nonverbal behaviors closely mimic how humans tend to encode their own communicative messages and to decode the messages of others. This increased compatibility (or match) between a character and an end-user will have a number of benefits:

An increase in the engagement level of an end-user resulting in shorter learning curves.

Increased trust or confidence in a character's ability to assist an end-user (i.e. end-users come to see the character as an 'ally' rather than a part of the complex system with which they are working).

End users will value the technology more highly (Reeves and Nass).

11. The selection of traits and non-verbal behaviors used are based on research in psychology and communications.

The traits, trait attributes, and associated verbal and non-verbal behaviors used in the personality workbench are all based on psychology and human communication research.

12. Personality is Assumed to be Indigenous to a Character.

The present invention presents a personality wholly integrated across all aspects of character realization including subsystems for appraisal, reactive behavior selection, persistent and episodic behavior selection and modulation. All subsystems act in accordance to present a pervasive, robust and consistent personality that remains intact over time.

The personality of a character is created in a design phase and leaves the workbench with a set of fully integrated personality attributes. This is unlike other approaches which have expressed character personality in an ad-hoc and piecemeal fashion. Character behaviors in other systems are isolated and appear without coordination in nonparallel behavioral subsystems. In short, personality expression in the other approaches is non-systemic and results in characters that appear shallow and unconvincing.

Technical Details

The "personality workbench" produces extensions and modifications to the basic action selection architecture. The architecture uses an ethological approach that ties behavior selection to traditional animal-world constructs, and may be extended to modeling human deliberative behavior.

Figure 2:
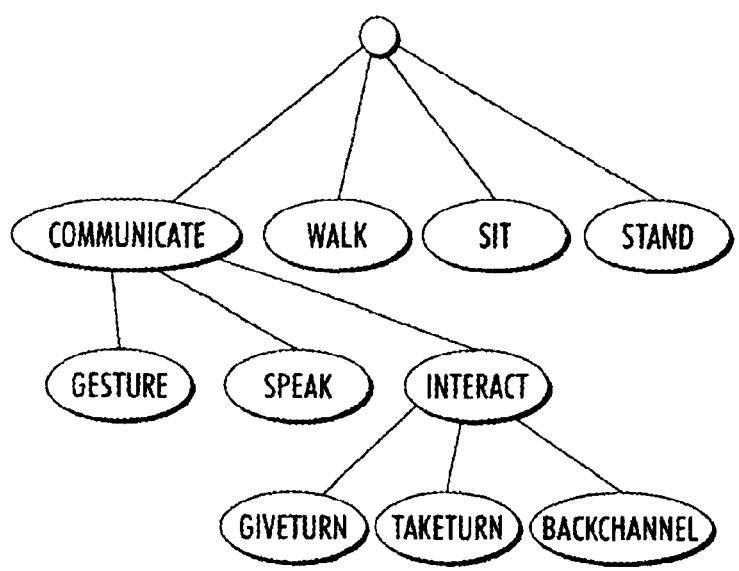
FIG. 2 is an example of a behavioral hierarchy useful for a conversational character.

The behaviors within a BASA are arranged in a hierarchy, as shown in FIG. 2. Behaviors are activities which the character can perform, with those at the top of the hierarchy being more abstract categories of behavior and those at the bottom being operational in that they have simulation routines associated with them which allow the character to perform them when commanded. Behaviors at each level in the hierarchy compete every time step of the simulation for control of the character. The result of this competition is one primary behavior, which is the primary action the character is performing, and secondary behaviors. The secondary behaviors are executed as long as they do not conflict with the primary behavior (where 'conflict' is defined with respect to the character simulation controls). Thus, the architecture supports the simulation of multiple parallel activities while maintaining a notion of behavioral focus.

Figure 3:
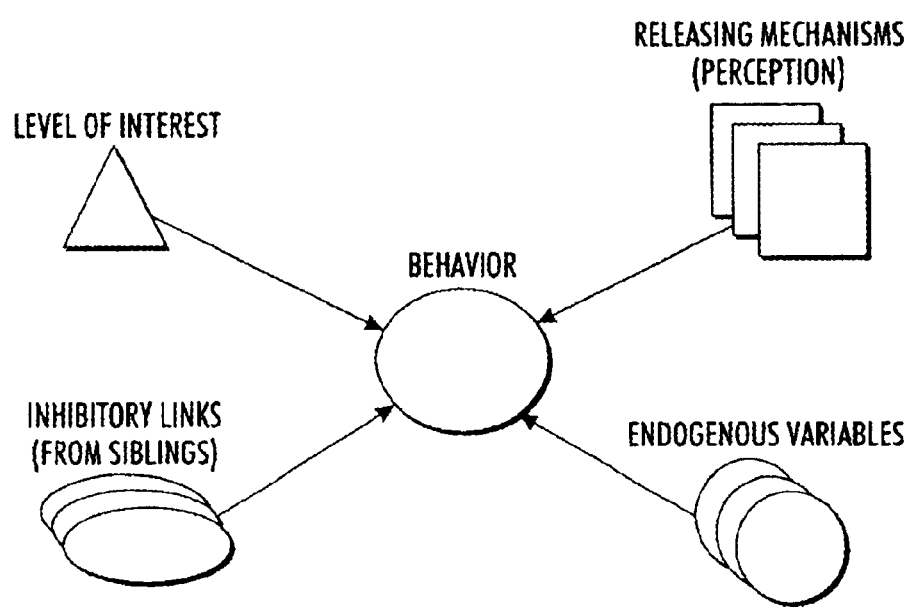
FIG. 3 is a diagram illustrating influences on a behavior for determination of a behavior activation level.

Behaviors from each level are selected based on a computation of activation level and competition with sibling behaviors. The factors which go into the calculation of activity level are (see FIG. 3):

Endogenous variables. These correspond to internal states such as blood sugar level, hormone levels, hunger or thirst. Modeled as a continuous variable where a sufficiently high value helps influence the selection of a behavior (drinking in response to thirst).

External states and releasing mechanisms. External states are events or objects detected in the environment by sensors. Releasing mechanisms are 'perceptual interpretations' of external stimuli that signal an object or event is important to the agent.

Inhibition and fatigue (level of interest). When behaviors compete amongst each other they do so on the basis of each behavior's activation level and inter-behavior inhibition. The activation value is determined in part by the endogenous variables and releasing mechanisms described previously. These two factors cannot determine the right amount of persistence (i.e. too much dithering between multiple behaviors) nor account for opportunistic responses (i.e. not persisting in one behavior to the exclusion of other goals). To model persistence, competing behaviors are assumed to be mutually inhibiting—some behaviors can post a higher gain for performance relative to others. The higher the gain, the greater the persistence. Modeling opportunistic behaviors requires some notion of time-sharing among activities. The construct of fatigue assumes that when a behavior is selected as primary, its level of fatigue will increase proportionally over time, which will reduce the overall activation value of that behavior. When the value of the current primary behavior falls below that of a competing behavior the competing behavior will become primary.

This architecture can be further extended to simulate elements of human deliberative behavior. In one embodiment, such extension is performed by coupling the architecture with a task planner. When a plan has been produced, it can be used to bias the activation level for the behavior(s) corresponding to the next step(s) in the plan when their preconditions are satisfied. In this way, the reactive action selection architecture can be used as an intelligent plan execution environment, in which unplanned behaviors can still be performed opportunistically if warranted.

We summarize the features of a reactive behavior selection architecture that are particularly amenable to expressing an integrated personality through trait-indicative behavior selection.

- Behaviors are organized in loose hierarchies with the leaf nodes in the hierarchy containing character simulation information (i.e. the directions about how to move the 'muscles' of the character to perform the behavior).
- Character simulation information is described in terms of specific 'degrees of freedom' which refer to the points on the character's body that can be moved. (These are a fixed set of points and generally correspond to the joints of the character's body.) Having a character make an expansive beckoning gesture with its arm requires the use of three degrees of freedom—the elbow, wrist and shoulder.
- At any point in time a character will be engaged in only one activity called a primary behavior. The primary behavior has uncontested access to those degrees of freedom that it needs to perform.
- One or more behaviors (called secondary behaviors) can execute simultaneously with the currently selected behavior if the following are true:
  1. The value of the secondary behavior is sufficiently high.
  2. The degrees of freedom necessary to perform the secondary behavior are currently available (i.e. not being used).

Personality Design

Characters emerging from the personality design workbench have trait profiles that will generate individuated characters. In a primary embodiment, character trait profiles are made up of a set of five bi-polar traits each of which varies along a continuous dimension. The five primary traits are the standard "Big Five" traits used most in personality theory research (see Table 1).

TABLE 1

Trait Indices Used in Personality Workbench

Primary Traits

Dominant/Submissive
Warm/Cold
Conscientiousness
Emotional Stability
Openness

The workbench allows designers to create personality profiles for a character in three different ways. For example, in one embodiment:

1. For each of the traits, the designer can position a graduated dial at an arbitrary point between two anchors (i.e. a highly warm character would have the dial set very near the 'warm' anchor point on the dial). Designers must set at least two of the primary personality traits for each character. Primary traits not set by the designer are arbitrarily given default neutral settings that point in the middle of the anchors. A trait with a neutral setting means that the trait would not be readily inferred from the character's behavior (i.e. behaviors indicative of neutral-rated traits can appear in a character's behavior but not with a frequency that would be recognized by users.)

2. The designer can select personality attributes they want their character to manifest. Personality attributes are linguistic labels which describe attributes typically associated with each trait anchor end-point (e.g., 'warm' attributes include kind, sympathetic, soft-hearted, affectionate). The Personality Workbench will then map these selected attributes into a trait profile which can then be edited using method 1 above.

3. The designer can select a set of trait-indicative behaviors that she wants the character to perform. For example, a designer may not know what she wants in terms of a trait profile or attributes, but knows that she wants character which performs gesturing behaviors that are expansive and highly frequent. The Personality Workbench will then map these selected behaviors into a trait profile which can then be edited using method 1 above.

Personality Effectors

Figure 4:
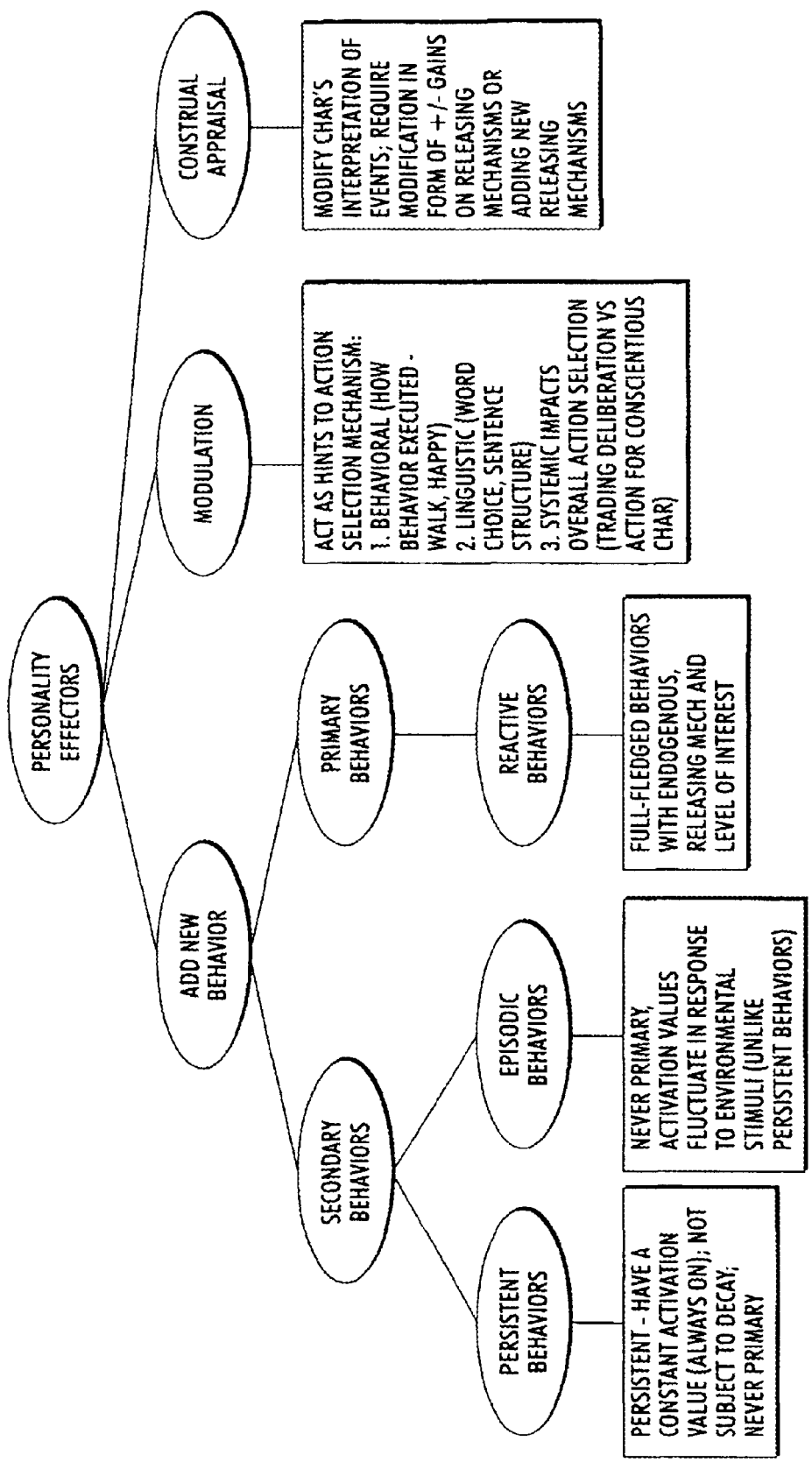
FIG. 4 is a classification hierarchy of personality effectors for implementing character traits.

The Personality Workbench translates the trait profiles for a character into the following personality effectors which modify the behavior of the basic action selection architecture described above (for example, any method that would convey behaviors associated with the character). A classification hierarchy of the personality effectors is illustrated in FIG. 4.

Persistent personality effectors. These are new behaviors added to the hierarchy for the character being designed. Persistent nonverbal behaviors have a constant activation value (i.e. are always 'on'), are not subject to decay (or fatigue) over time, and can never be selected as primary behaviors (i.e., can only be used as secondary behaviors). They function as default behaviors as they will always be expressed if the necessary simulation controls for expression are available (i.e. not currently being used by the primary behavior). Thus, persistent behaviors are constantly opportunistic—if the conditions are favorable they will always execute. For example, an introverted character may always exhibit a slumped posture unless it needs to reach something.

Episodic personality effectors. These are new behaviors added to the hierarchy for the character being designed.

These behaviors are similar to persistent behaviors in that they represent trait-indicative nonverbal behaviors and can never be selected as primary behaviors (they represent 'unconscious' non-deliberative actions on the part of the character). However they act like other behaviors in the behavioral hierarchy in that their activation values can fluctuate in response to environmental stimuli (unlike persistent behaviors). For example, introverts tend to display gaze avoidance behavior, but displaying that behavior only makes sense in the presence of others.

Reactive personality effectors. These are new behaviors added to the hierarchy for the character being designed. These behaviors are domain-dependent, full-fledged additions to the behavior hierarchy for a given application (i.e., they can have endogenous influences, releasing mechanisms, and level-of-interest functions), and represent the set of personality-specific, deliberative actions that a character may take in response to a given situation. For example, a dominant character may respond with a violent behavior in response to a goal-obstruction, whereas an introverted character may only blush.

Modulating personality effectors. These act as hints to the action selection system, affecting how different functions are performed rather than what functions are performed at any given time. There are three kinds of modulating effectors: 1) behavioral, which effect how a given behavioral simulation is executed (e.g., the 'walk' simulation may be modified to perform 'walk happily', 'walk timidly', 'walk boldly', or 'walk sadly'); 2) linguistic, which effect how the language synthesis parts of a Conversational Character system function (i.e., effecting word choice and sentence structure); and 3) systemic, which impacts the overall action selection system (e.g., trading deliberation vs. action for a conscientious character, increasing boredom/fatigue rates for happy-go-lucky characters, etc.).

Construal or appraisal functions. Personality can modify a character's interpretation of world events. In an ethological model this would require modifications in the form of increased or decreased gains on existing releasing mechanisms or adding new releasing mechanisms to existing behaviors. For example, a more submissive person would detect a dominant person sooner and would react accordingly in their presence (i.e. displaying submissive behaviors). At a deeper, psycho-sociological level, appraisal functions determine the character's assessment of actions taken by others and its impact on the character's affective state (endogenous variables), and is driven, at least in part, by the character's personality.

Non-behavioral effectors. Characters will have a physical presence for which viewers will infer personality characteristics. These features are physical in nature and are apparent throughout the lifetime of the character. Some examples include: body type (endomorph, ectomorph, mesomorph), facial structure (round/triangular face), attractiveness, and physical objects that the character may surround itself with (furniture, art, etc.). The initial version the Personality Workbench will simply popup a window with suggestions regarding appearance factors; future versions may actually be able to modify the character's 3D design.

Figure 5:
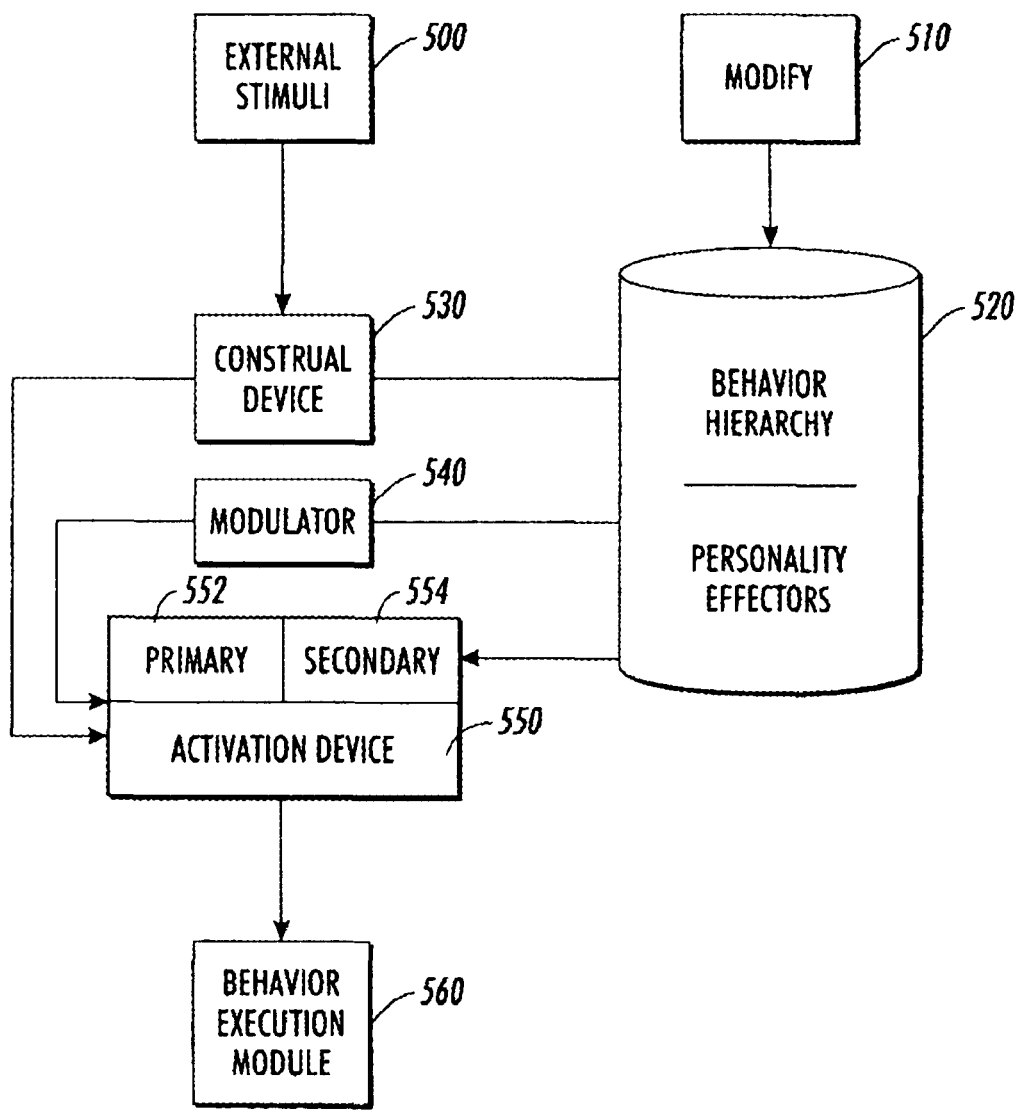
FIG. 5 is a block diagram of one embodiment of a device for rendering a personality.

FIG. 5 is a block diagram of one possible implementation of a device for rendering a personality. A behavior hierarchy is created or modified by a modifier 510. The modifier may include a device such as the personality workbench illustrated in FIG. 1.

The behavioral hierarchy 520 provides information on primary and secondary behaviors, modulation, and construal personality effectors, which are each interpreted by appropriate decices (primary activation device 552, secondary activation device 554, modulator 540, and construal device 530, respectively). Each of these devices provide inputs (specific action or amount of movement in a gesture, for example) to the activation device regarding behaviors consistent with and effecting the information in the behavioral hierarchy.

A construal device 530 receives external stimuli 500 and provides an interpretation of that stimuli to the activation device 550. The activation device 550 selects non-conflicting behaviors and considers external significance of external stimuli, and notifies a behavior execution module 560 of a selected behavior.

At this point, it is worthwhile to review some features of the present invention. The present invention allows a personality profile from a design phase (such as the output of the personality workbench described in FIG. 1) which is then translated into a new behaviorial heirarchy via a set of personality effectors. The new personality is an individuated behavioral hierarchy produced with personality biased behaviors, including, primary and secondary behaviors, modulated pre-existing behaviors, and construal changes. The new behavioral hierarchy is created at compile time (i.e., before the character is running), and has the capability to (1) add new behaviors (primary and secondary), (2) modulate existing behaviors in an existing hierarchy, and (3) modify a character's perception of external events.

Then, at run time, personality expression is accomplished in the following ways:

(1) Parallel use of secondary behaviors as a way of expressing differences between characters having a same primary behavior (the secondary behaviors grabbing free DOFs for an available for instantiating the secondary behavior);

(2) The use of new trait indicative primary behaviors, along with their own internal releasing mechanisms, that were added via the personality profile; and (3) Modulation of existing behaviors in the hierarchy, and/or perceptual and interpretive changes according to the personality profile.

The present invention as discussed herein has been described in reference to rendering a personality and methods and devices utilized in rendering a personality, preferably for synthetic characters. However, the teachings of the present invention may be applied to numerous other endeavors, including equipment for suggesting behaviors for humans, actors, electronic equipment, voice boxes, announcement devices, or other devices not necessarily associated with a synthetic character. In addition, the teachings of the present invention apply to any type of animated interface or presentation device (virtual classroom instructor, or tutor, for example) or other animated devices or icons. The present invention may be utilized in a computer interface or for directing operations of any type of equipment of varying configurations (televisions, VCR's, stereos, radar devices, toys, mechanical equipment such as heavy machinery, and building management/maintenance devices as just a few examples).

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes and methods of the present invention. The storage medium can include, but is not limited to, any type of disk including floppy disks, optical discs, DVD, CD-ROMs, microdrive, and magneto-optical disks, ROMS, RAMs, EPROMs, EEPROMS, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the processing of the present invention. Such software may include, but is not limited to, device drivers, peripheral equipment programs, operating systems, and user applications. Ultimately, such computer readable media further includes software for performing the functions of the present invention as described above.

Included in the programming (software) of the general/ specialized computer or microprocessor are software modules for implementing the teachings of the present invention, including, but not limited to, input and identification of user inputs, selection of personality traits, building a character profile, computing activation levels, and selection and activation of personality behaviors including movements and speech of a synthetic character or other animated character, voice, or display.

Obviously, numerous modifications and variations of the present invention are possible in light of the above teachings. It is therefore to be understood that within the scope of the appended claims, the invention may be practiced otherwise than as specifically described herein.

What is claimed is:

1. A system for designing personalities for synthetic characters, comprising:

a personality trait selection device that displays at least one selectable personality trait, said personality trait selection device comprises at least one trait indicator, each trait indicator representing an amount of a corresponding one of the selectable personality traits;

a personality builder that groups the selected personality traits into a character profile, said personality builder weights each selected personality trait in said character profile according the amount of each selected personality trait represented in the corresponding trait indicator;

a trait indicative behavior selection device that displays at least one selectable trait indicative behavior; and a mapper configured to map each selected trait indicative behavior into amounts of the trait indicators according to an amount each selected personality attribute is represented in the selectable personality traits.

2. The system according to claim 1, wherein the trait indicators are graduated dials operating between a high anchor and a low anchor.

3. The system according to claim 1, further comprising:

a personality attribute seletion device that displays at least one selectable personality attribute;

wherein the mapper is configured to map each selected personality attribute into amounts of the trait indicators according to an amount each selected personality attribute is represented in the selectable personality traits.

4. The system according to claim 1, wherein the selectable personality traits include at least one primary trait of dominance, warmth, conscientiousness, emotional stability, and openness.

5. The system according to claim 1, wherein said character profile comprises a translation of the selected personality traits into a weighted set of personality traits.

* * * * *